US012559263B2

(12) United States Patent
Warnock et al.

(10) Patent No.: US 12,559,263 B2
(45) Date of Patent: Feb. 24, 2026

(54) SEALING OF MULTI-LAYER INSULATION BLANKETS FOR SPACECRAFT

(71) Applicant: Maxar Space LLC, Palo Alto, CA (US)

(72) Inventors: Richard B. Warnock, Mountain View, CA (US); Jeanine M.W. Olson, San Jose, CA (US); Eric V. Werner, Mountain View, CA (US)

(73) Assignee: Lanteris Space LLC, Palo Alto, CA (US)

( * ) Notice: Subject to any disclaimer, the term of this patent is extended or adjusted under 35 U.S.C. 154(b) by 43 days.

(21) Appl. No.: 18/620,445

(22) Filed: Mar. 28, 2024

(65) Prior Publication Data

US 2024/0239523 A1 Jul. 18, 2024

Related U.S. Application Data

(62) Division of application No. 17/694,534, filed on Mar. 14, 2022, now Pat. No. 11,970,292.

(51) Int. Cl.
| | |
|---|---|
| *B64G 4/00* | (2006.01) |
| *B64G 1/36* | (2006.01) |
| *B64G 1/40* | (2006.01) |
| *B64G 1/52* | (2006.01) |

(52) U.S. Cl.
CPC ................. *B64G 4/00* (2013.01); *B64G 1/36* (2013.01); *B64G 1/40* (2013.01); *B64G 1/52* (2013.01); *B64G 2004/005* (2013.01)

(58) Field of Classification Search
CPC ...... B31B 70/64; B64G 4/00; B64G 2004/005
See application file for complete search history.

(56) References Cited

U.S. PATENT DOCUMENTS

| | | | |
|---|---|---|---|
| 4,438,168 A | 3/1984 | Testard | |
| 4,935,087 A * | 6/1990 | Gilman | A61F 13/0276 |
| | | | 156/515 |
| 5,630,895 A * | 5/1997 | Zeidler | E04D 13/1407 |
| | | | 427/186 |

(Continued)

FOREIGN PATENT DOCUMENTS

| | | | |
|---|---|---|---|
| CN | 103606580 A | 2/2014 | |
| CN | 111647361 A * | 9/2020 | C09J 5/02 |

(Continued)

OTHER PUBLICATIONS

Translation of CN-111647361 (Year: 2020).*

(Continued)

*Primary Examiner* — William L Gmoser
(74) *Attorney, Agent, or Firm* — Pearl Cohen Zedek Latzer Baratz LLP

(57) ABSTRACT

To facilitate on-orbit servicing, such as for a refueling operation, techniques are presented for a servicing satellite to cut through the multi-layer insulation blanket of a client satellite to provide access to the client satellite without releasing unacceptable quantities of foreign object debris from the multi-layer insulation. The serving satellite includes a sealing tool, such as a pair of heater rollers, that apply pressure and heat to the insulating blanket to melt the inner layers and seal the outer layers together. The servicing satellite can then use a cutting tool to cut the sealed region and access the client satellite.

19 Claims, 11 Drawing Sheets

(56) References Cited

U.S. PATENT DOCUMENTS

| | | | |
|---|---|---|---|
| 5,693,447 A * | 12/1997 | Takeyama | B41M 5/38207 |
| | | | 428/913 |
| 6,776,258 B1 | 8/2004 | Grosskrueger et al. | |
| 6,843,446 B2 | 1/2005 | Scott | |
| 6,871,477 B1 * | 3/2005 | Tucker | A61K 9/7023 |
| | | | 53/433 |
| 7,438,264 B2 | 10/2008 | Cepollina et al. | |
| 7,513,459 B2 | 4/2009 | Cepollina et al. | |
| 7,513,460 B2 | 4/2009 | Cepollina et al. | |
| 7,799,254 B2 * | 9/2010 | Harvey | B26F 1/24 |
| | | | 264/156 |
| 8,074,935 B2 | 12/2011 | Gryniewski et al. | |
| 8,196,870 B2 | 6/2012 | Gryniewski et al. | |
| 8,818,911 B2 | 8/2014 | Kaye et al. | |
| 8,906,185 B2 * | 12/2014 | McLean | B65D 51/20 |
| | | | 156/244.11 |
| 9,108,747 B2 | 8/2015 | Roberts et al. | |
| 9,321,175 B2 | 4/2016 | Smith | |
| 9,475,248 B1 * | 10/2016 | Russell | B65D 75/008 |
| 9,670,383 B2 * | 6/2017 | Yamauchi | B29C 48/154 |
| 9,688,422 B2 | 6/2017 | Roberts et al. | |
| 10,661,509 B2 * | 5/2020 | Uttaro | B29C 66/91933 |
| 11,788,167 B2 * | 10/2023 | Zhang | C21D 9/50 |
| | | | 148/522 |
| 12,091,201 B2 * | 9/2024 | Seok | B65B 51/26 |
| 2005/0211839 A1 | 9/2005 | Movsesian et al. | |
| 2012/0080563 A1 | 4/2012 | Gryniewski et al. | |
| 2012/0112009 A1 | 5/2012 | Gryniewski et al. | |
| 2012/0325972 A1 | 12/2012 | Gryniewski et al. | |
| 2016/0039544 A1 | 2/2016 | Roberts et al. | |
| 2023/0002147 A1 * | 1/2023 | Parachini | B65B 51/16 |
| 2023/0286678 A1 | 9/2023 | Warnock et al. | |

FOREIGN PATENT DOCUMENTS

| | | |
|---|---|---|
| JP | H0679786 A | 3/1994 |
| WO | WO9704192 A1 | 2/1997 |
| WO | WO2013/053047 A2 | 4/2013 |
| WO | WO2013/082719 A1 | 6/2013 |

OTHER PUBLICATIONS

Examination Report dated May 30, 2024, Canadian Patent Application No. 3,189,648.

Amendment dated Oct. 1, 2024, Canadian Patent Application No. 3,189,648.

Notice of Allowance dated Dec. 28, 2023, U.S. Appl. No. 17/694,534, filed Mar. 14, 2022.

* cited by examiner

View A-A

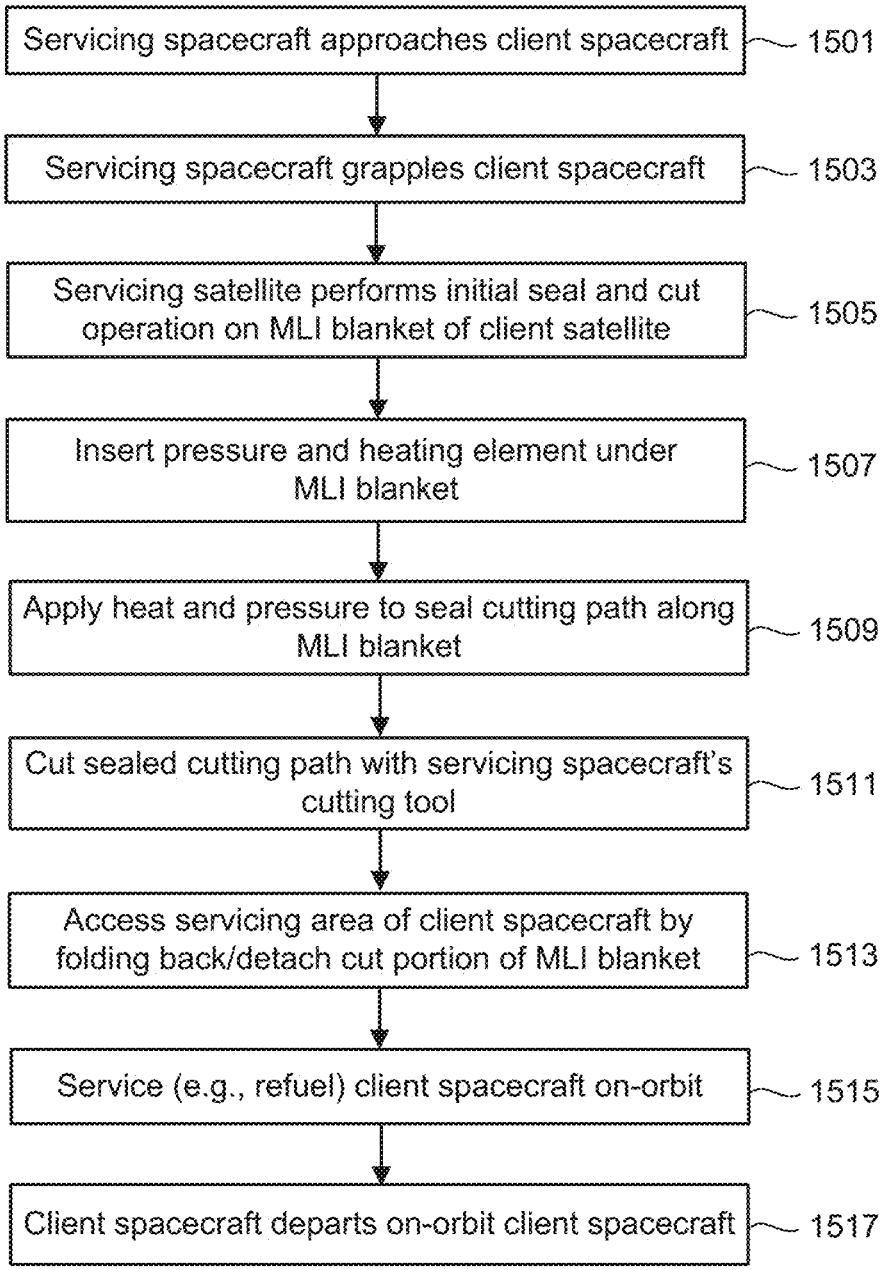

| | |
|---|---|
| Servicing spacecraft approaches client spacecraft | 1501 |
| Servicing spacecraft grapples client spacecraft | 1503 |
| Servicing satellite performs initial seal and cut operation on MLI blanket of client satellite | 1505 |
| Insert pressure and heating element under MLI blanket | 1507 |
| Apply heat and pressure to seal cutting path along MLI blanket | 1509 |
| Cut sealed cutting path with servicing spacecraft's cutting tool | 1511 |
| Access servicing area of client spacecraft by folding back/detach cut portion of MLI blanket | 1513 |
| Service (e.g., refuel) client spacecraft on-orbit | 1515 |
| Client spacecraft departs on-orbit client spacecraft | 1517 |

Figure 15

| Assemble spacecraft | — 1601 |

| Cut the MLI blanket materials to shape | — 1603 |

| Assemble layers of the MLI blanker | — 1605 |

| Seal edges of MLI blanket with pressure and heat | — 1607 |

| Cover spacecraft with sealed MLI blanket | — 1609 |

| Place spacecraft into stowed configuration | — 1611 |

| Mont spacecraft in stowed configuration onto launch vehicle | — 1613 |

| Launch spacecraft | — 1615 |

SEALING OF MULTI-LAYER INSULATION BLANKETS FOR SPACECRAFT

This application is a divisional of U.S. patent application Ser. No. 17/694,534 filed Mar. 14, 2022, published as U.S. Publication No. 2023/0286678 on Sep. 14, 2023, and issued as U.S. Pat. No. 11,970,292 on Apr. 30, 2024, by Warnock et al., entitled "SEALING OF MULTI-LAYER INSULATION BLANKETS FOR SPACECRAFT," incorporated by reference herein in its entirety.

CLAIM OF PRIORITY

This application is a divisional of U.S. patent application Ser. No. 17/694,534 filed Mar. 14, 2022, published as U.S. Publication No. 2023/0286678 on Sep. 14, 2023, by Warnock et al., entitled "SEALING OF MULTI-LAYER INSULATION BLANKETS FOR SPACECRAFT," incorporated by reference herein in its entirety

BACKGROUND

The number of space activities and the number of entities performing space activities has been increasing. For purposes of this document, space activities are functions performed completely or partially in space. The term "space" refers to being beyond the Earth's atmosphere, in orbit around the Earth, or at a distance from the Earth's surface that is equivalent to (or greater than) a distance of an object in orbit around the Earth. Examples of space activities include communication, transport, solar system exploration and scientific research. For example, the International Space Station is an orbiting research facility that functions to perform world-class science and research that only a micro-gravity environment can provide. Other activities performed in space can also be considered space activities.

Many services are provided by spacecraft. For example, satellites in geosynchronous orbit are used to provide communications (e.g., Internet Access, television broadcasts, telephone connectivity) and data gathering services (e.g., weather data, air traffic control data, etc.). Because longitudes ("slots") at which spacecraft may be stationed in geosynchronous orbit are limited, there is a strong market demand to maximize the revenue generated from each slot. As a result, satellites disposed in geosynchronous orbit have become larger, more complex and expensive, with satellite operators demanding higher power, more payload throughput, and multi-payload spacecraft. The cost to build and deploy such satellites has become increasingly expensive.

Due to the high cost of building and launching of spacecraft, it would be useful to be able to extend the life of on-orbits spacecraft such as by refueling or other servicing operations while a satellite is on-orbit. However, these operations are quite complicated and present many challenges.

BRIEF DESCRIPTION OF THE DRAWINGS

FIG. 15 is a flowchart for one embodiment of performing an on-orbit servicing operation that includes the sealing and cutting of multi-layer insulation blanket.

DETAILED DESCRIPTION

To prolong satellite life, on-orbit servicing is desirable, for example to refuel the satellite or to replace or repair components. Refueling valves or other components that need to be accessed during such operations are frequently disposed within or behind thermal blankets that may need to be cut or removed prior to on-orbit servicing. Such thermal blankets are commonly configured as multi-layer insulation (MLI) blankets in which an upper layer and lower layer that are each formed from a polyimide (e.g., Kapton) sheet enclose multiple layers 603 of thermoplastic sheets (such as polyethylene terephalate e.g., Mylar) that may be alternated with and separated by other thermoplastic layers like polyester netting. A problem addressed by embodiments presented in the following is that the radiation environment of space tends to deteriorate and embrittle the thermoplastic inner layers, resulting in fragmenting or flaking of the material, particularly for older satellites that are more likely to need refueling. Such deterioration is not ordinarily a serious problem for the spacecraft because the resulting fragments are contained between the MLI's upper layer and lower layer of polyimide, but when a cutting operation is performed on the MLI to access components of the spacecraft under the MLI, this can release unacceptable quantities of Foreign Object Debris (FOD).

This following describes techniques to cut and seal the MLI to prevent FOD release and which can be combined with an in-line cutter so that a seal and cut operation is performed in one continuous process. Embodiments presented below take advantage of the property that the inner layers of the MLI are thermoplastic in nature. A heated tool (e.g., heated inner/outer rollers or hotfoot/anvil) is used to melt the inner plies and weld them together and also seal to the aluminized surface of the outer polyimide layers, forming a complete seal. These heated tools can be in-line with a cutter, so the sealing/cutting operation happens as a single operation. The cutting mechanism can be a static blade in-line with the heat seal mechanism or a rotary blade, for example, with the sealed pathway wide enough to accommodate the cutting path with tolerance.

Figure 1:
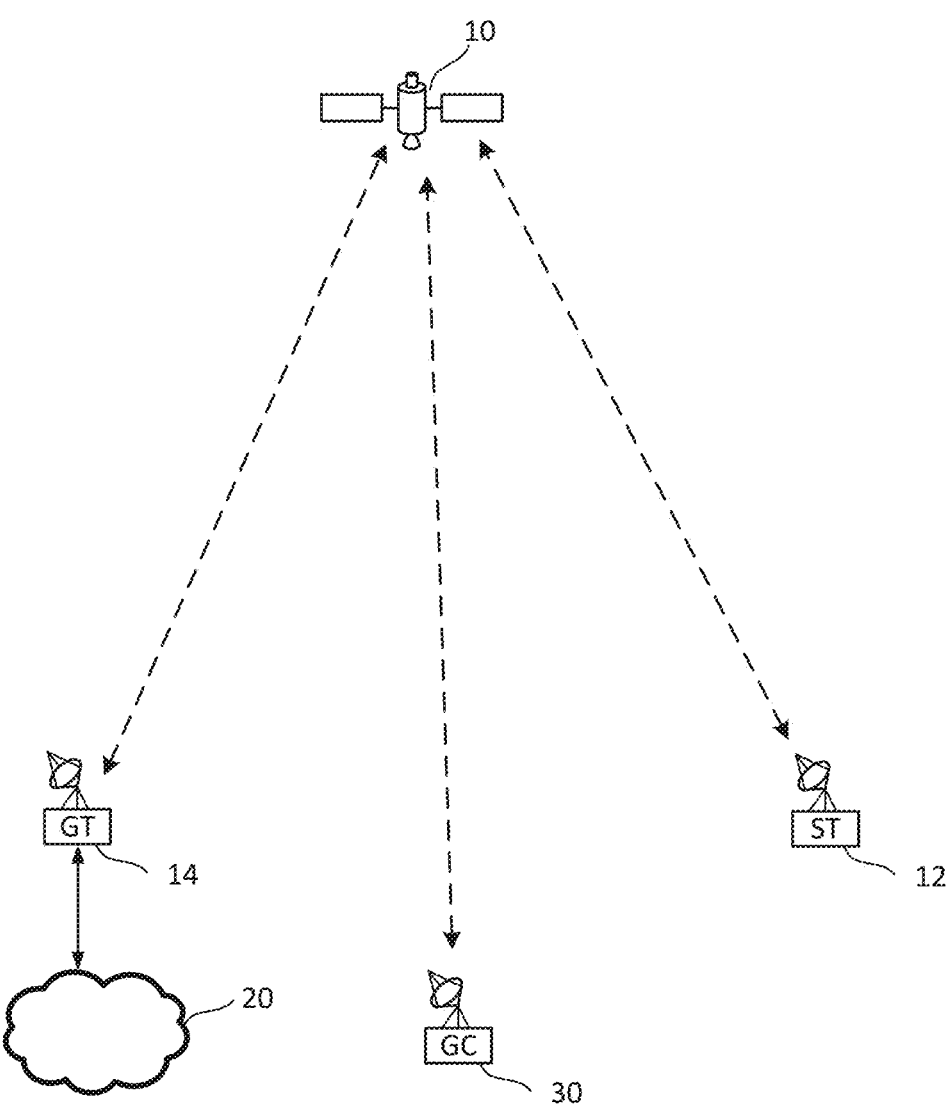
FIG. 1 is a block diagram of a spacecraft system.

FIG. 1 is a block diagram of a spacecraft system that can implement the technology proposed herein. The system of FIG. 1 includes spacecraft 10, subscriber terminal 12, gateway 14, and ground control terminal 30. Subscriber terminal 12, gateway 14, and ground control terminal 30 are examples of ground terminals. In one embodiment, spacecraft 10 is a satellite; however, spacecraft 10 can be other types of spacecrafts (e.g., shuttle, space station, inter-planet traveling craft, rocket, etc.). Spacecraft 10 may be located, for example, at a geostationary or non-geostationary orbital location. Spacecraft 10 can also be a Low Earth Orbit satellite. Spacecraft 10 is communicatively coupled by at least one wireless feeder link to at least one gateway terminal 12 and by at least one wireless user link to a plurality of subscriber terminals (e.g., subscriber terminal 12) via an antenna system. Gateway terminal 14 is connected to the Internet 20. The system allows satellite 10 to provide internet connectivity to a plurality of subscriber terminals (e.g., subscriber terminal 12) via gateway 14. Ground control terminal 30 is used to monitor and control operations of spacecraft 10. When reference is made to a specific embodiment for the spacecraft 10, the example of a communication satellite will often be used in the following, although the techniques are more widely applicable, including other or additional payloads such as for an optical satellite.

Figure 2:
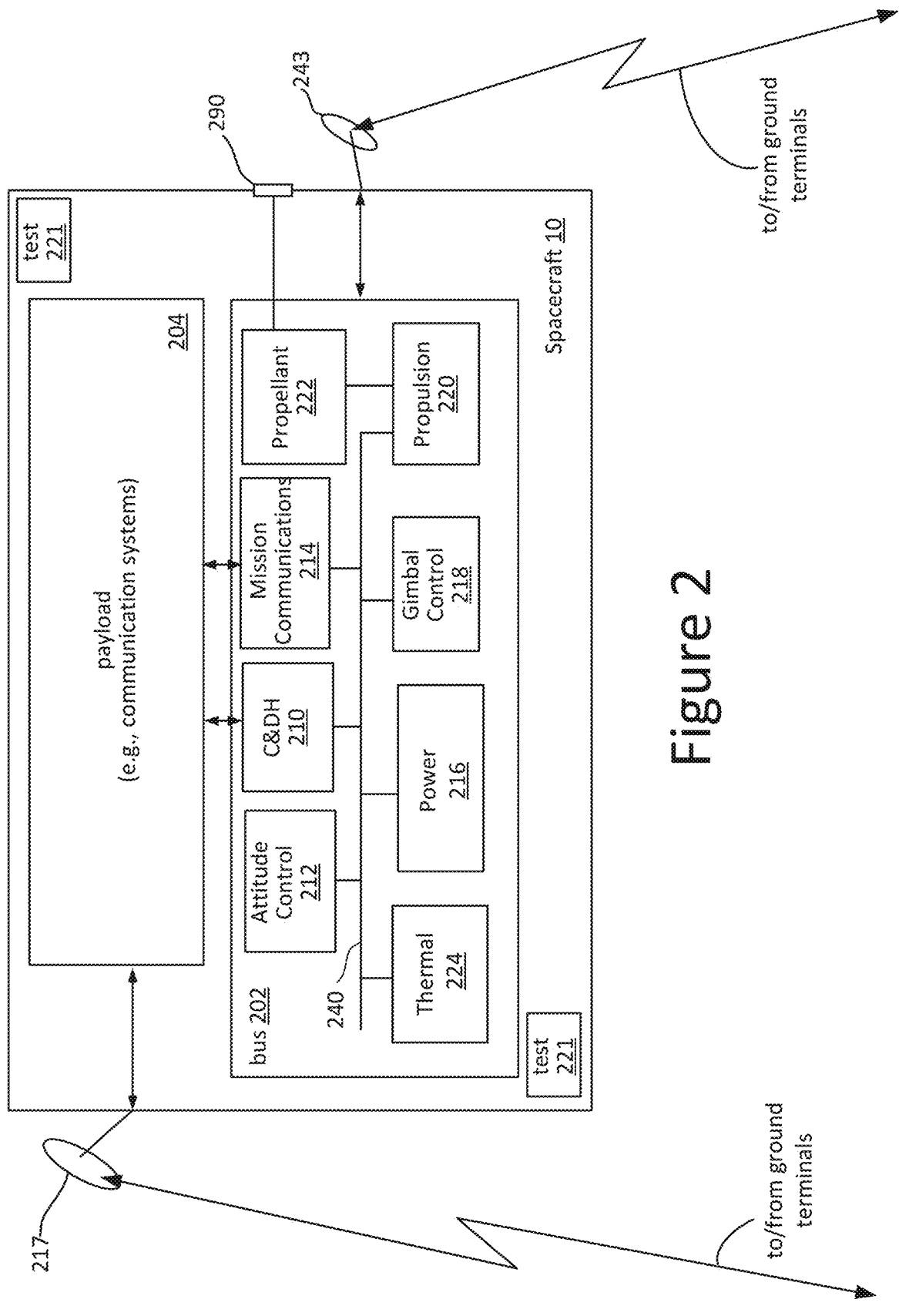
FIG. 2 is a block diagram of an example spacecraft.

FIG. 2 is a block diagram of one embodiment of spacecraft 10, which in one example (as discussed above) is a satellite, that can be a client spacecraft for an on-orbit servicing operation. In one embodiment, spacecraft 10 includes a bus 202 and a payload 204 carried by bus 202. Some embodiments of spacecraft 10 may include more than one payload. The payload provides the functionality of communication, sensors and/or processing systems needed for the mission of spacecraft 10.

In general, bus 202 is the spacecraft that houses and carries the payload 204, such as the components for operation as a communication satellite. The bus 202 includes a number of different functional sub-systems or modules, some examples of which are shown. Each of the functional sub-systems typically include electrical systems, as well as mechanical components (e.g., servos, actuators) controlled by the electrical systems. These include a command and data handling sub-system (C&DH) 210, attitude control systems 212, mission communication systems 214, power subsystems 216, gimbal control electronics 218, a propulsion system 220 (e.g., thrusters), propellant 222 to fuel some embodiments of propulsion system 220, and thermal control subsystem 224, all of which are connected by an internal communication network 240, which can be an electrical bus (a "flight harness") or other means for electronic, optical or RF communication when spacecraft is in operation. Also represented are an antenna 243, that is one of one or more antennae used by the mission communications 214 for exchanging communications for operating of the spacecraft with ground terminals, and a payload antenna 217, that is one of one or more antennae used by the payload 204 for exchanging communications with ground terminals, such as the antennae used by a communication satellite embodiment. The spacecraft can also include a number of test sensors 221, such as accelerometers that can used when performing test operations on the spacecraft. Other equipment can also be included.

The command and data handling module 210 includes any processing unit or units for handling includes command control functions for spacecraft 10, such as for attitude control functionality and orbit control functionality. The attitude control systems 212 can include devices including torque rods, wheel drive electronics, and control momentum gyro control electronics, for example, that are used to monitor and control the attitude of the space craft. Mission communication systems 214 includes wireless communication and processing equipment for receiving telemetry data/ commands, other commands from the ground control terminal 30 to the spacecraft and ranging to operate the spacecraft. Processing capability within the command and data handling module 210 is used to control and operate spacecraft 10. An operator on the ground can control spacecraft 10 by sending commands via ground control terminal 30 to mission communication systems 214 to be executed by processors within command and data handling module 210. In one embodiment, command and data handling module 210 and mission communication system 214 are in communication with payload 204. In some example implementations, bus 202 includes one or more antennae as indicated at 243 connected to mission communication system 214 for wirelessly communicating between ground control terminal 30 and mission communication system 214. Power subsystems 216 can include one or more solar panels and charge storage (e.g., one or more batteries) used to provide power to spacecraft 10. Propulsion system 220 (e.g., thrusters) is used for changing the position or orientation of spacecraft 10 while in space to move into orbit, to change orbit or to move to a different location in space. The gimbal control electronics 218 can be used to move and align the antennae, solar panels, and other external extensions of the spacecraft 10.

In one embodiment, the payload 204 is for a communication satellite and includes an antenna system (represented by the antenna 217) that provides a set of one or more beams (e.g., spot beams) comprising a beam pattern used to receive wireless signals from ground stations and/or other spacecraft, and to send wireless signals to ground stations and/or other spacecraft. In some implementations, mission communication system 214 acts as an interface that uses the antennae of payload 204 to wirelessly communicate with ground control terminal 30. In other embodiments, the payload could alternately or additionally include an optical payload, such as one or more telescopes or imaging systems along with their control systems, which can also include RF communications to provide uplink/downlink capabilities.

The block diagram of FIG. 2 also includes an example of an external port 290, such as a fuel port for the fueling the spacecraft 10, whether for an initial on-ground filling of the propellant 222 or, as described in more detail below, refueling of the spacecraft 10 after launch by a servicing satellite. Depending on the embodiment, the spacecraft 10 may have multiple such external ports 290 for refueling or other servicing or test functions.

Figures 3, 4:
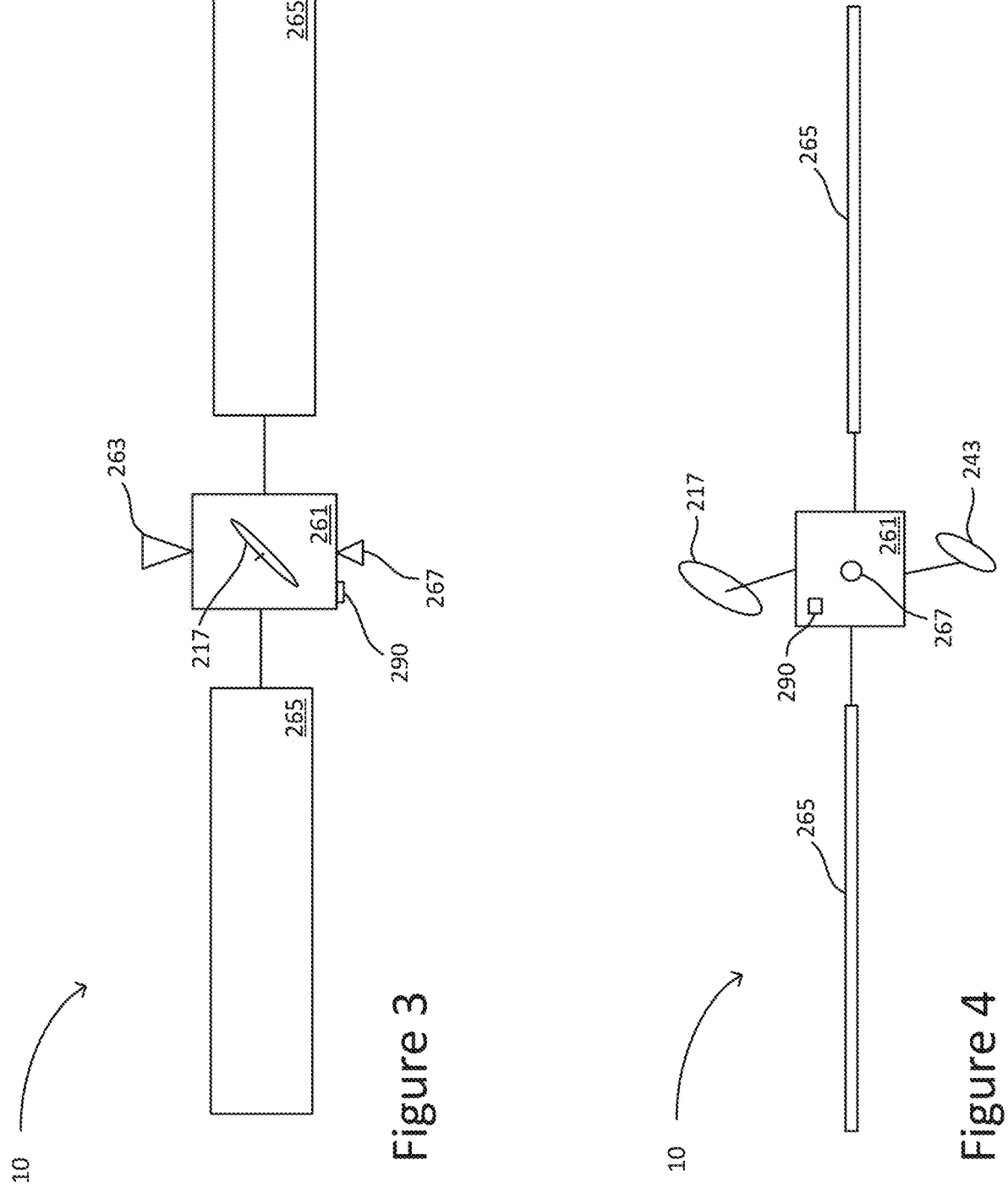
FIGS. 3 and 4 illustrate two views of a spacecraft with a universal test port positioned on an external surface.

FIGS. 3 and 4 look an exterior view for an embodiment of spacecraft 10 in more detail. More specifically, FIGS. 3 and 4 show two views of an embodiment of spacecraft 10, where FIG. 4 shows the spacecraft rotated by 90° about the axis of the solar arrays 265 relative to FIG. 3. A number of different embodiments are possible, but the example of FIGS. 3 and 4 can be used to illustrate some of the elements relevant to the current discussion.

Referring to FIGS. 3 and 4, the spacecraft 10 includes a spacecraft body 261 from which extend two, in this example, deployed solar arrays 265. Attached to the body will also be one or more number of antennae 217 and 243 as described above, by which the satellite can receive and transmit signals. Depending on the particulars of the embodiment, a satellite may have a large number of antennae, but only a pair of antennae for exchanging signals with a ground station are shown. Attached to the satellite body 261 are a number of thrusters, as shown at 263 and 267, which typically include one or more main thrusters and a number of attitude and orbit control thrusters. Internal to the body will be the spacecraft's frame (not show) within which the functional sub-systems can be installed.

The deployed arrays 265 can include a solar array, a thermal radiating array, or both and include one or more respectively coplanar panels. The deployed arrays 265 can be rotatable by the gimbal control 218 about the longitudinal axis (the left-right axis in FIGS. 3 and 4), in order to achieve or maintain a desired attitude with respect to, for example, the sun. For embodiments in which the deployed arrays 265 include a solar array, the solar array may be articulable so as to be substantially sun facing. The deployed solar array 265 may be sized and positioned so as to generate substantially more power from sunlight than would be possible if the solar array was fixedly disposed on the body 261 of the spacecraft 10. For example, in some implementations, the solar array orientation may be rotatable about the longitudinal axis of the spacecraft 10 so that photovoltaic power generating surfaces of the solar array remains substantially sun facing.

Also represented in FIGS. 3 and 4 is an external port 290 located on an external surface of the spacecraft. In FIG. 3 the eternal port 290 is located on the lower ("−Z") external surface, which is on the outward-facing surface in the rotated view of FIG. 4. As discussed further in the following, the external port 290 is connected to the multiple ones of the functional sub-systems or modules illustrated in FIG. 2 by way of internal cables so that external text equipment for these sub-systems can be attached at this single location without opening up the spacecraft or running additional cables.

Figure 5:
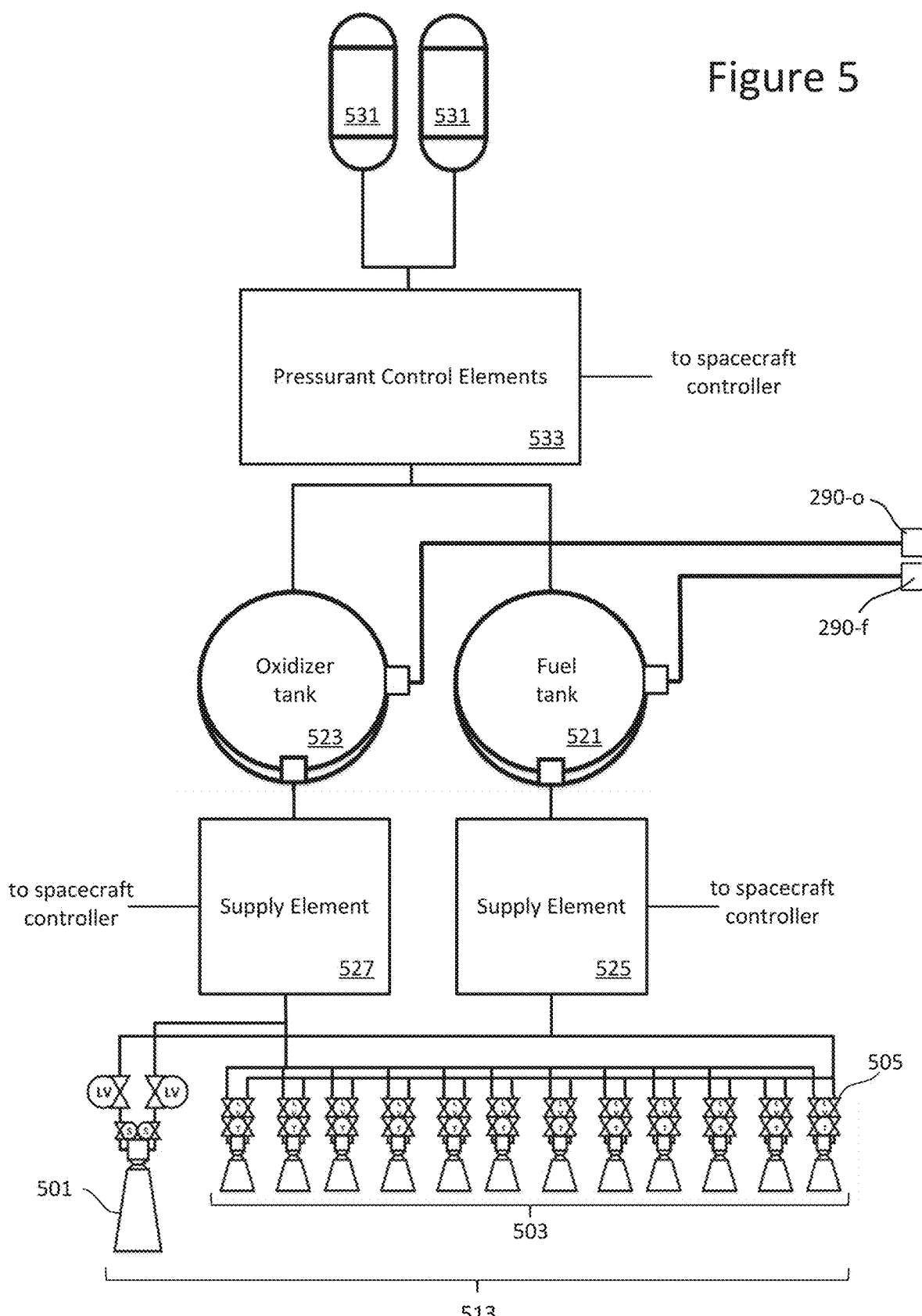
FIG. 5 provides more detail on an embodiment of a spacecraft's propulsion subsystem.

In the following, the on-orbit servicing of a client spacecraft will mainly be presented in the context of a refueling operation. FIG. 5 present more detail on the propulsion system 220 and propellant 222 components of spacecraft 10.

Figure 9:
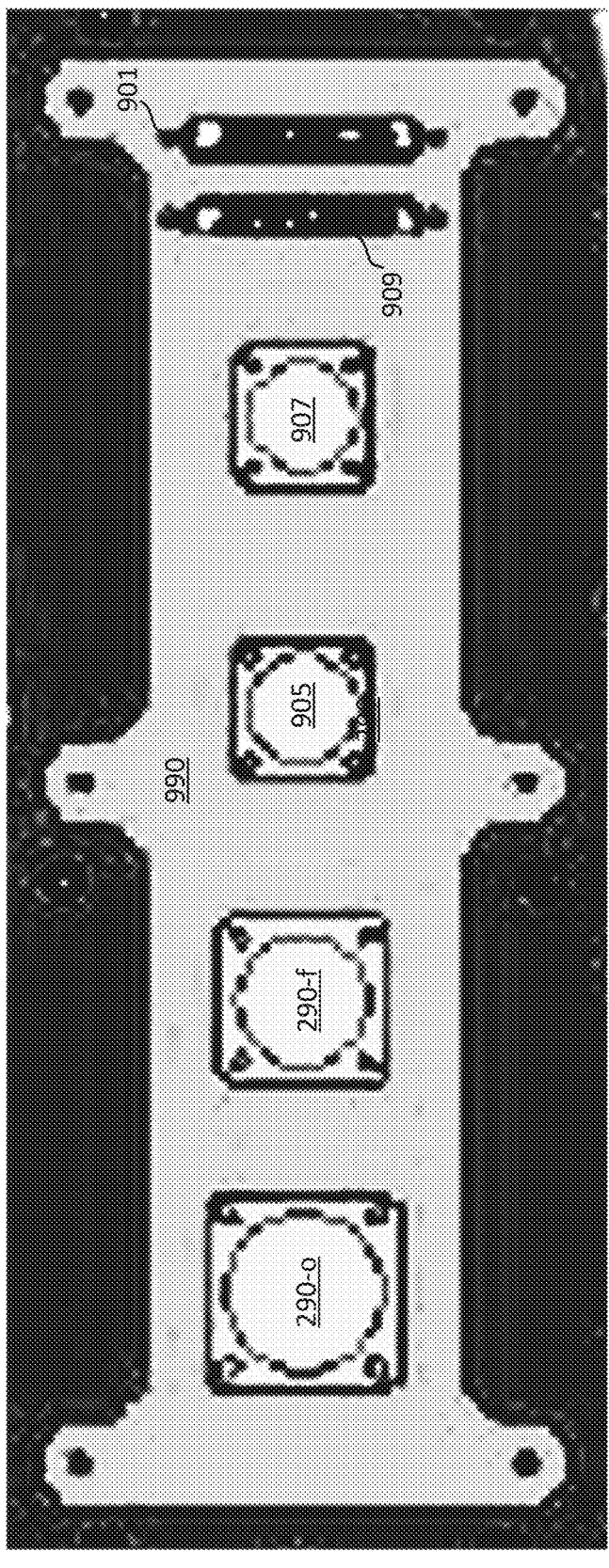
FIG. 9 is a representation for an embodiment of the external port.

FIG. 5 provides more detail on an embodiment of the propulsion system 220, propellant 222, and thrusters 513. The thrusters 513 can include one or more powerful thrusters 501 arranged to be the primary source of thrust to move the spacecraft 10, plus a number of attitude and orbit control thrusters 503 used to make finer adjustments when moving the spacecraft and stabilize the satellite during both movement and performing servicing operations. For example, referring back to FIGS. 3 and 4, a primary thruster could be placed on the service satellite's body as shown at 113 on the side opposite the fluid release output 111. The additional attitude and orbit control thrusters 203 (not shown in FIGS. 3 and 4) could then be distributed on the various surfaces of the satellite body to provide control and maneuverability. The representation of the primary thruster 501 and attitude and orbit control thrusters 503 as arranged along a line in FIG. 9 is only meant to simplify the schematic representation and not meant to be representative of their placement on the satellite body.

In the embodiment of FIG. 5, the primary thruster 501 and attitude and orbit control thrusters 503 are fed through valves (such as indicated at 505 for the left-most altitude and orbit control thruster, which can be connected to and controller by the spacecraft control circuitry such as altitude control 212 and C&DH 210) by a fuel tank 521 and an oxidizer tank 523 by way of respective supply elements 525, 527. The supply elements can include the various valves, filters, pressure transducers, fill/drain valves for the fuel tank 521 and the oxidizer tank 523, and other elements commonly used in a propulsion subsystem 220 and are connected to spacecraft controller elements for the maneuvering of the spacecraft 10. In other embodiments, the spacecraft 10 can have a monopropellant propulsion system in which a single propellant can provide thrust through means of chemical decomposition. Although not illustrated in FIG. 9, the thrusters (501, 503) are also connected to and individually controllable by the spacecraft controller elements of FIG. 2 for maneuvering and controller of the spacecraft 10.

The propulsion subsystem 220 can also include pressurant tanks 531 connected to the fuel tank 521 and the oxidizer tank 523 though the pressurant control elements 533. The pressurant control elements 533 can include valves, filters, pressure transducers, pressure regulators, fill/drain valves for the fuel tank 521 and the oxidizer tank 523, and other elements commonly used in a propulsion subsystem 220 and can connected to spacecraft controller circuitry to control the application of pressurant from tanks 531.

FIG. 5 also illustrates examples of external ports 290-0 and 290-*f* that a servicing satellite can use to respectively refill the oxidizer tank 523 and the fuel tank 521. Depending on the embodiment, the external ports 290-0 and 290-*f* can be the same ports used to initially fill the oxidizer tank 523 and the fuel tank 521 prior to launch or be external ports 290-0 and 290-*f* specific to on-orbit refueling. In either case, prior to launch the external ports 290-0 and 290-*f* will often have been covered with a multi-layer insulation blanket that is placed over the body of the spacecraft 10 for its protection. In some cases, the MLI blanket could have an opening to allow access to the external ports 290-*o* and 290-*f*, but often they will under the MLI. This is particularly true of older spacecraft for which on-orbit servicing was not envisioned at the time of launch. It is also for older spacecraft that the MLI material is most likely to have deteriorated and be prone to emit harmful amounts of foreign object debris that can damage the client spacecraft, the servicing space craft, or other spacecraft in whose path they may drift.

Figure 6:
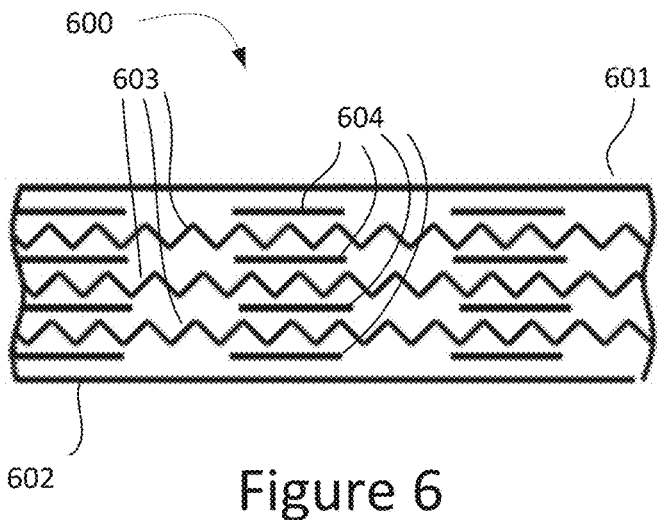
FIG. 6 illustrates a cross sectional schematic of an embodiment of an MLI blanket configuration.

FIG. 6 illustrates a cross sectional schematic of an embodiment of an MLI blanket configuration. The MLI blanket 600 includes an upper layer 601 and lower layer 602, each formed from a polyimide (e.g., Kapton) sheet. The inner layer 601 and lower layer 602 enclose multiple layers 603 of thermoplastic sheets (such as polyethylene terephalate e.g., Mylar) that may be alternated with/separated by other thermoplastic layers, such as polyester netting, 604.

Figure 7:
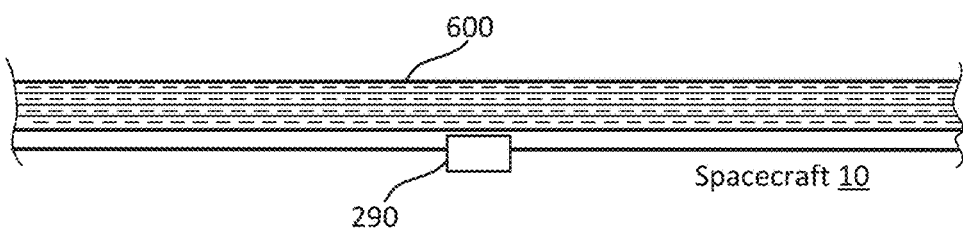
FIG. 7 illustrates an MLI blanket over a portion of the body of spacecraft to protect the internal components of the spacecraft.

FIG. 7 illustrates an MLI blanket 600 over a portion of the body of spacecraft 10 to protect the internal components of the spacecraft 10. Depending on the embodiment, the MLI 600 of FIG. 7 can be as described with respect to FIG. 6 or other thermal blanket. As shown in FIG. 7, the MLI 600 covers the external port 290 so that it cannot be readily accessed.

Figure 8:
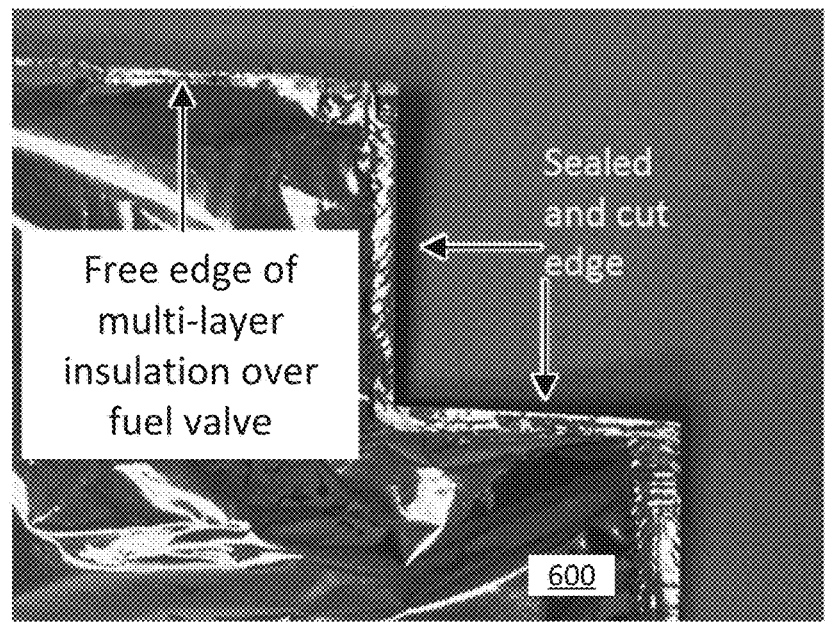
FIG. 8 is an image of a portion of an MLI blanket 600 that has been sealed and cut.

Because the melt temperature of thermoplastic sheets 603 such as polyethylene terephalate (Mylar) is lower than the decomposition temperature of polyimide of upper layer 601 and lower layer 602, application of appropriate levels of heating to the area of an intended cut may result in sealing or entrapping the polyethylene terephalate fragments that would otherwise escape and result in dangerous quantities of FOD. For example, heat application at, e.g., 300° C. can result in local melting of the inner layers 603 of thermoplastic sheets, such as polyethylene terephalate, and bonding of molten material to the outer layers 601 and 602 of polyimide (e.g., Kapton), as illustrated in FIG. 8. The heat application may also result in melting of the other thermoplastic layers, such as polyester netting, 604. The temperature of the applied heat can be selected to cause the local area to reach a temperature sufficiently high enough to melt the inner layers 603 and/or polyester netting 604 in a reasonable process time and sufficiently low enough to avoid damaging the polyimide sheet the outer layers 601 and 602.

FIG. 8 is an image of a portion of am MLI blanket 600 that has been sealed and cut. The shown portion of the MLI blanket 600 has been sealed and cut along its edges, such as for the free edge that could be covering of a fuel value or other externa port. Depending on the embodiment, the heat to seal the edge can be applied can be applied using a type of ironing tool or a heated roller configured to apply heat and pressure, where some examples are illustrated below with respect to FIGS. 11-14. Depending on the implementation, a balance between pressure and temperature may be achieved as, with higher temperatures, less pressure may be needed and with higher pressures, less heating may be required. Moreover, the heating tool may be configured to include an in-line cutting tool, such that the heat application and cutting are performed as part of a single operation.

FIG. 9 is a representation for an embodiment of the external port 990, where the black background corresponds to a surface of the spacecraft 10. In this embodiment, a number of different ports are located in the same area on the body of the spacecraft for convenience of servicing, but in other cases these may distributed across various regions of a client spacecraft 10. In addition to an external port 290-o for refilling the oxidizer tank 523 and an external port 290-f for refilling the fuel tank 521, a number of other ports such as ports 905, 907, 909, and 901 can be included. These additional ports can be used for on-orbit servicing operations such as to receive data, perform system-level tests of electrical systems, flight software (FSW) image, system normal operation test data, and other test and service operations. For example, the ports 901, 905, 907, and 909 could be used to diagnose problems with the spacecraft 10 and provide software updates. Each of these connectors can include a mechanical interface configured to engage the client spacecraft 10 to the corresponding connectors of a servicing spacecraft. A number of different types and differing form factors are known in the art for such connectors and their configurations and any appropriate such connector can be used.

Figure 10:
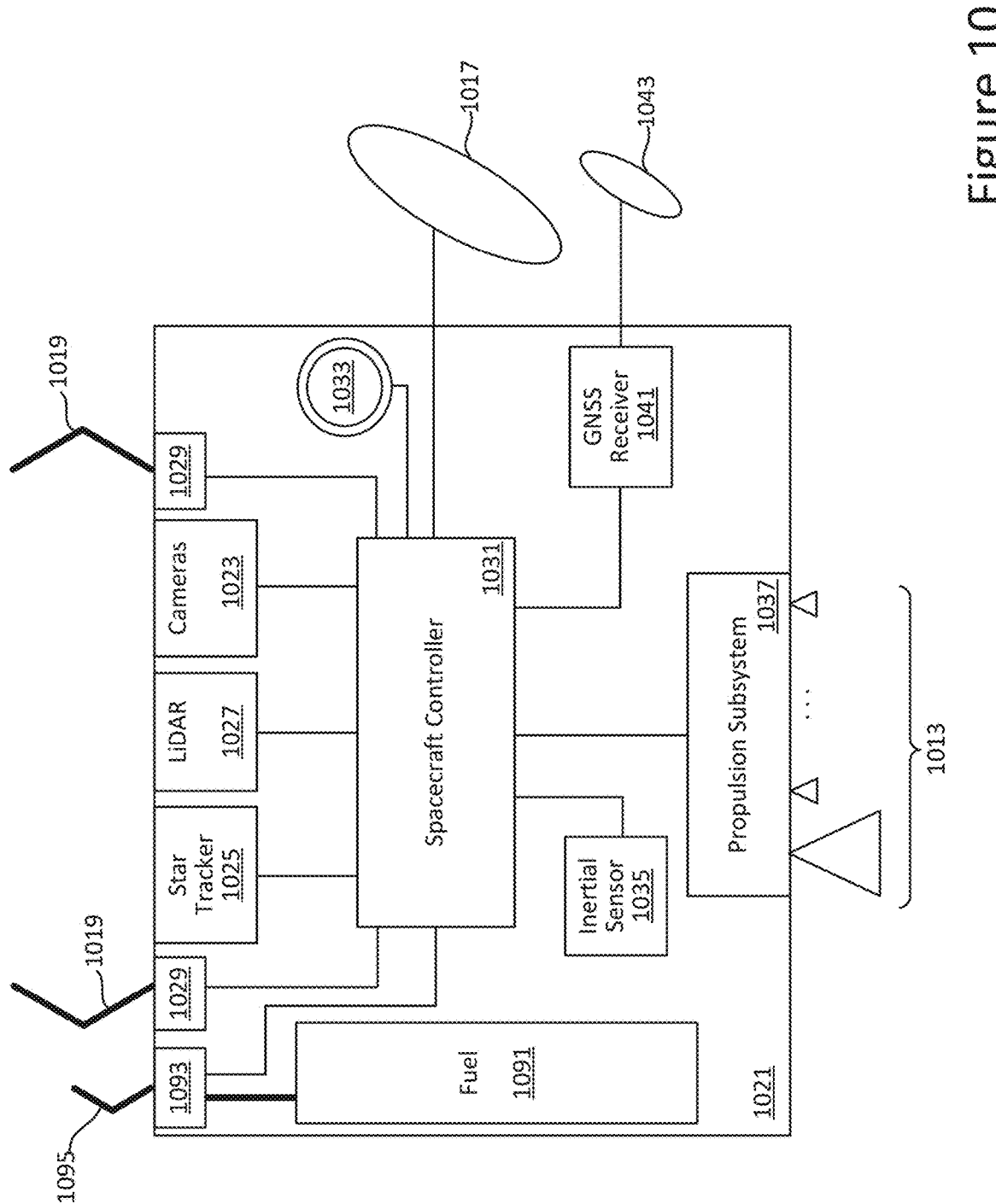
FIG. 10 is a block diagram for an embodiment of servicing satellite's body.

FIG. 10 is a block diagram for an embodiment of servicing spacecraft 1021. The serving craft 1021 can be similarly constructed to the client spacecraft 10, but different features are highlighted in FIG. 10 due to their differing roles. Spacecraft body 1021 can include a propulsion subsystem 1037 and spacecraft controller 1031. The spacecraft controller can include or be included in a spacecraft attitude and orbit control subsystem and is communicatively coupled with propulsion subsystem 1037 and may be configured to control the operation of propulsion subsystem 1037 including thrusters 1013. In an embodiment, for example, propulsion subsystem 1037 includes propulsion equipment, such as tankage and control and service devices and thrusters 1013, such as that described above with respect to FIG. 5.

The spacecraft controller 1031 may be configured to execute, autonomously, or in response to ground command, the presently disclosed techniques of operating and servicing a target satellite, where the servicing satellite 1021 can have one or more antennae 1017 for communication with ground stations. Implementations of the subject matter described in this specification may be implemented as one or more computer programs. i.e., one or more modules of computer program instructions, encoded on non-transitory computer readable medium for execution by, or to control the operation of, a data processing apparatus, such as, for example, spacecraft controller 1031.

The satellite can also be equipped with a Global Navigation Satellite System (GNSS) signal receiver 1041 and corresponding GNSS antenna 1043, where GNSS include the United States' Global Positioning System (GPS), Russia's GLONASS, China's BeiDou Navigation Satellite System (BDS), and the European Union's Galileo. GNSS Signal processing is typically performed in the GNSS receiver 1041. A GNSS receiver 1041 typically has some memory, a processor, and other components for the computation of a navigation solution given the received GNSS signal.

Still referring to FIG. 10, the body of servicing spacecraft 1021 can include one or more star trackers 1025, inertial rate sensors (e.g., gyroscope and accelerometer) 1035, or both. Inertial rate sensors 1035 may include a digital integrating rate assembly (DIRA) or the like. In an embodiment, determination of spacecraft inertial attitude may be performed by spacecraft controller 1031 using the output of star tracker 1025 and/or inertial sensors 1035. The servicing spacecraft 1021 can also include one or more reaction wheels 1033 that may be configured as torque actuators to control spacecraft rotation rates about one or more axes and also be used by the controller 1031.

For observing a client spacecraft and performing refueling or other servicing operations, in addition to equipment for performing normal satellite operation and for the maintenance operations on a target satellite, the servicing satellite 1021 can be equipped with a control system including a controller 1031, 6 degree-of-freedom thruster control, cameras 1023 and optics (which can include infra-red and visible light) and LiDAR (light detection and ranging) 1027, in addition to star trackers 1025, reaction wheels 1033, accelerometers, and gyroscopes coupled with autonomous Rendezvous and Proximity Operations (RPO) software (such as that designed by the Charles Stark Draper Laboratories), for example. With these sensors, or sensor suite, and software, a servicing satellite 1021 can have the capability of precise relative navigation when in close proximity to a target client spacecraft.

The satellite body 1021 can also include control mechanisms 1029 for robotic arms 1019, which can be formed of multiple links connecting a number of joints, or other devices for use in servicing a target satellite. The control mechanisms 1029 can include servos, actuators, and other elements to move and control the robotic arms 1019 or other devices in response to the controller 1031. These operations can be based on input from the ground, autonomous, or a combination of these and can use input for the cameras 1023 and LiDAR 1027, for example.

The robotic arms can include the cutting tools and heating tools described below for sealing and cutting the MLI, as well as other servicing operations, and also from grappling the client satellite to hold it place during servicing. For the refueling example, the satellite can include a refueling arm 1095 and corresponding control mechanism 1093 in communication with the spacecraft controller to provide fuel from a fuel tank 1091 through the external port or ports 290 of the client spacecraft to refill the fuel tank 521 and/or oxidizer tank 523.

Figure 11:
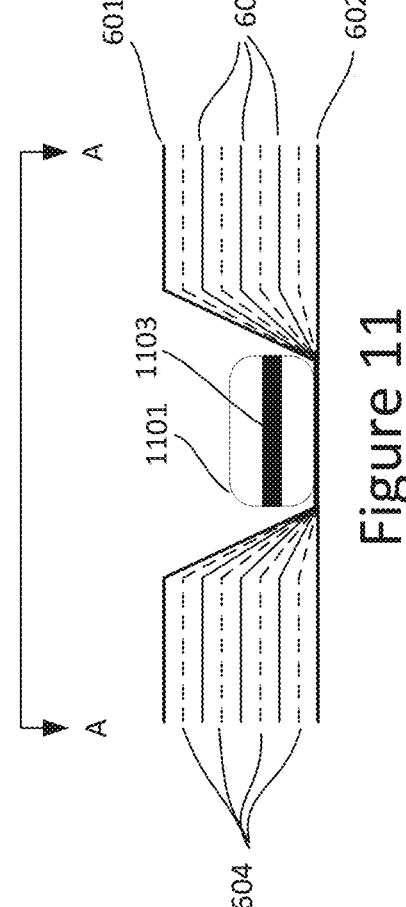
FIGS. 11 and 12 present embodiments for a mechanism for sealing together of the outer layers and of an MLI blanket.
Figure 12:
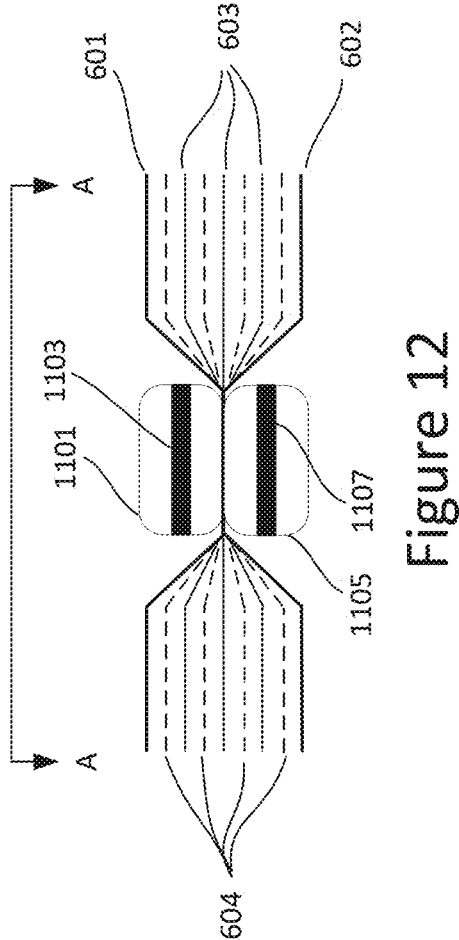

FIGS. 11 and 12 present embodiments for a mechanism for sealing together of the outer layers 601 and 602 of an MLI blanket. The MLI in these examples can be the of the same structure as described above with respect to FIG. 6, with alternating layers of thermoplastic sheets 603 (such as polyethylene terephalate) and other thermoplastic layers like polyester netting 604 between the outer layers 601 and 602. In the embodiment of FIGS. 11 and 12, the sealing mechanism includes one or a pair of heated rollers to provide the compaction pressure and melting energy to melt the inner layers 603 and 604 to seal outer layers 601 and 602 together. In one example of alternate embodiments, a hot foot on one side with an anvil type structure on the other side to provide the needed heat and pressure. FIG. 11 shows a single roller 1101 on an axel 1103 pressing down upon and heating the MLI from a single side, where the pressure on the underside can be provided by the body of the spacecraft 10 or other surface placed under the lower surface 602 of the MLI. The structure of the axel 1103 can include a heating element or transmit heat from a robotic arm (not shown in FIGS. 11 and 12) of the servicing space craft to which it is attached. Depending on the embodiment, the roller 1101 may be a single roller or a pair of rollers, as shown in FIG. 12.

FIG. 12 shows a pair of rollers 1101 and 1105 on respective axels 1103 and 1107 that are configured to press the MLI layers together from both the top and bottom. One or both of roller 1101 and 1105 can provide heat. In order to place the lower roller 1105 beneath the bottom outer layer 602 of the MLI blanket, it may be needed to make an initial cut in the MLI, in which case a single roller, as with roller 1101 in FIG. 11 can initially seal enough of the MLI so that the initial cut can be made so that the lower roller 1105, or other lower element, can be inserted to provide pressure, heat, or both to the MLI from below. Also marked in FIGS. 11 and 12 is an indication of a cross-section indication between A and A to illustrate the top view as illustrated in FIG. 13.

Figure 13:
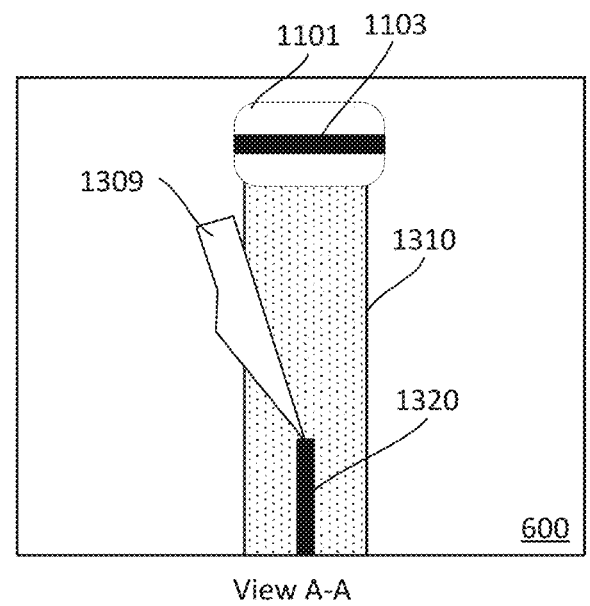
FIG. 13 is a schematic representation of top view of the MLI 600 during a seal and cut operation as taken along the line A-A of FIG. 11 or 12.

FIG. 13 is a schematic representation of top view of the MLI 600 during a seal and cut operation as taken along the line A-A of FIG. 11 or 12. A top layer roller 1101 on axel 1103 is moving upward in this representation and the lower roller 1105 would be under MLI 600 and not visible in the angle. As the heated roller 1101 moves upward, it melts the inner layers of MLI 600 together to form the sealed region 1310 of the cutting path, after which cutting tool 1309 follows to cut open the MLI 600 along cut 1320. The robotic arm holding the lower roller 1105 would be inserted through the cut 1320 behind the cutting tool 1309. (The robotic arms, such as robotic arms 1019 of FIG. 10, to which the axle 1103 and cutting device 1309 are connected are also not shown in FIG. 13 to simplify the presentation.)

Figure 14:
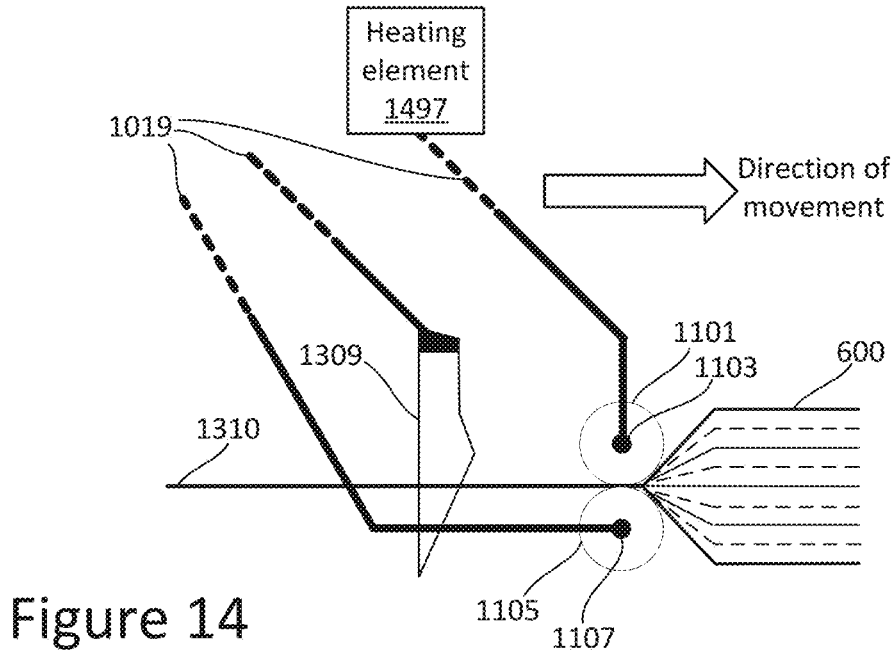
FIG. 14 is a side view of an embodiment of the sealing and cutting mechanism.

FIG. 14 is a side view of an embodiment of the mechanism of the sealing tool and cutting tool. In the representation of FIG. 14 the MLI is pressed together between the rollers 1101 and 1105 as they move laterally across the surface of the MLI 600 towards the right. The axels 1103 and 1107 of respective rollers 1101 and 1105 are attachments connected along one or several robotic arms 1019 to the servicing spacecraft. One or both of the rollers 1101 and 1105 are heated, so that the combination of heat and pressure melt the inner layers of MLI 600 form the sealed region 1310 of the cutting path. The cutting tool 1309 is also connected as an attachment on one of the robotic arms 1019 and moves along behind the rollers 1101 and 1105 of the sealing tool to make the cut (1320 in FIG. 13) within the sealed region 1310 of the cutting path. The sealing tool of rollers 1101 and 1105, the cutting tool 1309, and the heating 1497 and the corresponding robotic arms can all be controlled by the spacecraft control system 1031 or other control circuitry on servicing spacecraft 1021. The robotic arm for the lower roller 1105 is inserted into the cut behind the cutting tool and extends to hold the lower roller 1105 to below the upper roller.

FIG. 14 also represent a heating element 1497 attached to the portion of robotic arm 1497 attached to axel 1103 of upper roller 1101 to heat the upper roller 1101. In other embodiments, lower roller 1005 can alternately or additionally be heated by heating element 1497 or other heating element. In some embodiments, the cutting tool 1309 could also be heated. The heating element 1497 can heat the arm, that would have the thermal conductivity to heat the axel 1003, which would in turn heat the roller 1101. Alternately, the heating element 1497 could provide an electrical current to a heating element in the axel 1103. For any of the embodiments, the heat element or elements 1497 can control or modulate the temperature so that the inner layers of MLI blanket 600 are melted to fuse the other layer, but not melt the outer layers.

As illustrated in FIGS. 11-14, the heating and cutting tool can take advantage of the thermoplastic nature of the MLI's inner layers 603 and 604 for the heater tool, whether for the roller embodiments 1101 and 1105 presented above or alternate embodiments such as a hotfoot/anvil combination to melt the MLI's inner plies and weld the outer layer together. Depending on the embodiment, the cutting mechanism can be a static blade, such as the cutting tool 1309, or other cutting elements, such as a rotary blade. The sealed region 1310 of the cutting path should be wide enough to have a tolerance to accommodate the cutting toll with a margin of, for example, an inch or less, such as around a quarter of an inch. Concerning the application of heat and pressure, this should be sufficient to cause the local area of the (to be) sealed region 1310 to reach a temperature sufficiently high enough to melt the polyethylene terephalate or other inner layer materials and sufficiently low enough to avoid damaging the polyimide sheet or other material of the outer layer, where this will depend on the specifics to the material, but could, for example, be around 300° C., such as in a range of 275° C.-375° C. There will also be balance between processing time and temperature used as it may be that, with higher temperatures, less time is needed and with lower temperatures, longer heating is required.

Although the discussion so far has been in the context of on-orbit servicing, the techniques may also be applied to ground fabrication of MLI blankets, edges of which are conventionally sealed with tape. In a typical ground fabrication process, a spacecraft is assembled and then its body is covered with an MLI blanket, where, depending on the embodiment, fueling and other preparatory operations can be performed before or after the MLI blanket is installed and some operations (e.g., the attachment of solar arrays or antennas) can also be performed after installing the MLI blanket. The cut edges of the MLI blanker have traditionally been sealed with a tape, which can be a labor-intensive process. When the techniques presented above of applying pressure and heat to seal the edges of the MLI blanket are performed in connection with ground fabrication, the sealing (of the blanket edge) may obviate a need for the conventional application of a tape, more effectively sealing the edges as well as saving on the mass from the tape and possible reducing labor. The sealing of the edges can be performed using an apparatus similar to that illustrated above with respect to FIGS. 11-14, but without a cutting tool 1309 as MLI blankets can be cut during the fabrication process in the standard way. Once the fabrication of the spacecraft is complete, it can be placed into a stowed configuration and placed onto a launch vehicle.

FIG. 15 is a flowchart for one embodiment of performing an on-orbit servicing operation that includes the sealing and cutting of the client spacecraft's multi-layer insulation blanket. Beginning at step 1501, a servicing spacecraft approaches an on-orbit client spacecraft. The client spacecraft can be the spacecraft 10 as described above with respect to FIGS. 1-5 and the servicing spacecraft a spacecraft 1021 as described with respect to FIG. 10. The servicing spacecraft can use the various guidance and sensor systems described with respect to FIG. 10 to locate and approach the target satellite 10 and then, at step 1503, to grapple the target satellite using the robotic arms 1019, after which the client satellite 10 can be serviced.

If, as part of the servicing operation, the servicing satellite 1021 needs to access the client satellite 10 at areas covered with an MLI blanket, a seal and cut operation is performed in steps 1505-1513. If the pressure and heating tool has an element to apply pressure and or heat both above and below the MLI blanket, and the bottom of the MLI blanket 600 is not accessible, at step 1505 an initial seal and cut operation is performed at step 1505 to provide an opening in the MLI blanket 600. For example, in an implementation based on the embodiments of FIGS. 11-14, if the lower roller 1105 cannot initially be placed under the MLI blanket 600, an initial sealing operation can be performed using just the upper roller 1101 as illustrated in FIG. 11 to seal an area for the cut 1320 large enough to be cut by the cutting tool 1309 to allow the insertion of the lower roller 1105 as shown in FIG. 14 at step 1507. In some cases, such as when the seal and cut operation starts at or near an edge of the MLI blanket, the servicing satellite 1021 may be able to insert the lower pressure and sealing element without step 1505. The initial seal and cut operation at step 1505 can be performed on an area of the MLI blanket 600 adjacent to the subsequent sealing operation at step 1509.

At step 1509 the sealed region 1310 of the cutting path of the MLI blanket is formed as illustrated in FIG. 14 by applying heat and pressure from, in this embodiment, the upper and lower rollers 1101 and 1105 to seal the region for the cut 1320 by the cutting tool 1309 at step 1511. The rollers 1101 and 1105 and cutting tool 1309 can be attachments to robotic arms 1019 of servicing spacecraft 1021 and cut out a flap or panel at or near the areas of the client spacecraft 10 that are to be accessed in the servicing operation. At step 1513 the area is accessed by folding back the flap or removing the panel cut in the MLI blanket 600.

The servicing operation is performed at step 1515. For example, the servicing satellite 1021 can refuel client satellite 10 from the fuel tank 1091 using the refueling arm 1095 and corresponding control mechanism 1093 to refill fuel tank 521 by external port 290-f or oxidizer tank 523 by external port 290-o. Alternately, or additionally, the other external ports illustrated in FIG. 9 to service or diagnose the client satellite 10. Once the on-orbit servicing operation is completed, the servicing satellite 1021 departs at step 1517, leaving the client satellite on-orbit.

As noted above, the pressure and heat technique can also be used to seal the edges on MLI blankets during the on-ground fabrication processes. This can be described with respect to FIG. 16.

Figure 16:
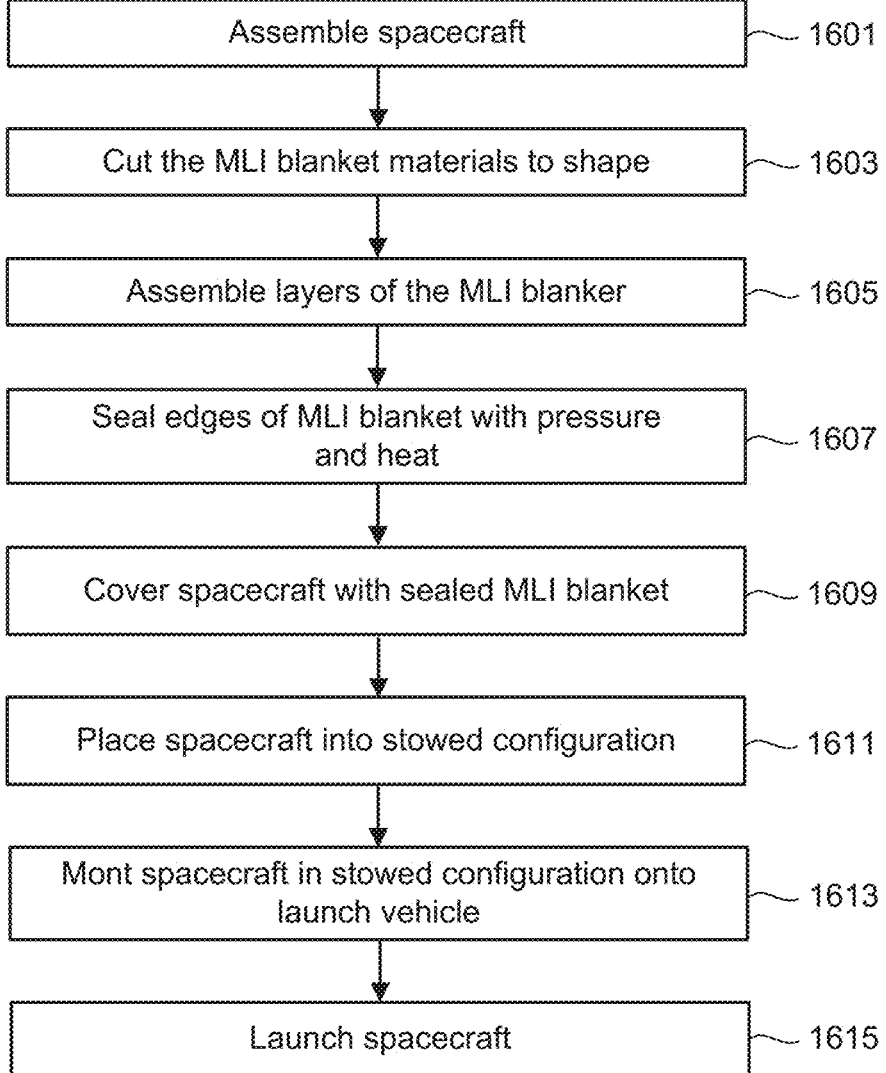
FIG. 16 is a flowchart for one embodiment of using the heat and seal process for sealing the edges of multi-layer insulation blanket during on-ground fabrication of a spacecraft.

FIG. 16 is a flowchart for one embodiment of using the heat and seal process for sealing the edges of multi-layer insulation blanket during on-ground fabrication of a spacecraft. At step 1601 the spacecraft, such as spacecraft 10 of FIG. 1-4 or spacecraft 1021 of FIG. 10, is assembled. Depending on the embodiment, some parts of the assembly of the step 1601, such as attaching of solar panels, antenna, or robotic arms may be performed after the MLI blanket is fitted to the body of the spacecraft at step 1609. The MLI blanket materials are cut to shape at step 1603 and the layers assembled at step 1605. In some embodiments the layers can be assembled first, and then cut to shape. Some embodiments cutting MLI blanket at step 1603 can include the inclusion of access points for refueling or other on-orbit servicing operations. At step 1607 the edges can be sealed by application of pressure and heat using an apparatus such as the mechanism with the rollers 1101 and 1105 described with respect to FIGS. 11-14. The spacecraft is then covered with the sealed MLI blanket at step 1609. Once the spacecraft is covered and fitted with the sealed MLI blanket, the spacecraft is put into a stowed configuration at step 1611, such as by folding up solar arrays, antennas, reflectors, robotic arms, or other retractable appendages. Once in a stowed configuration, the satellite can be mounted onto a launch vehicle at step 1613 prior to launching at step 1615.

One embodiment includes a spacecraft that includes: a propulsion subsystem; one or more robotic arms configured to perform a servicing operation on a second spacecraft; and a spacecraft controller connected to the propulsion subsystem and the one or more robotic arms. The one or more robotic arms comprise: a sealing tool configured to apply heat and pressure to an area of an insulating blanket of the second spacecraft to seal together outer layers of the area of the insulating blanket; and a cutting tool configured to cut the insulating blanket in sealed area. The spacecraft controller is configured to approach the spacecraft to the second spacecraft by use of the propulsion subsystem and, using the one or more robotic arms: grapple the second spacecraft; seal a first area of an insulating blanket of the second spacecraft with the sealing tool; cut the insulating blanket of the second spacecraft at the sealed first area with the cutting tool; and access the second spacecraft through the cut in the sealed first area of the insulating blanket.

One embodiment includes a method that comprises approaching an on-orbit client spacecraft by a servicing spacecraft, where at least a portion of the client spacecraft being covered with a multi-layer insulating blanket. The method also includes grappling the client spacecraft by the servicing spacecraft and performing, by the servicing spacecraft, an on-orbit servicing operation of the grappled client spacecraft. The servicing operation includes: sealing a first area of the multi-layer insulating blanket by applying heat and pressure to the first area of the multi-layer insulating blanket with a sealing tool of the servicing spacecraft; cutting an opening in the first area of the multi-layer insulating blanket with a cutting tool of the servicing spacecraft; and accessing the client spacecraft by the servicing spacecraft through the cut in the sealed first area of the multi-layer insulating blanket.

One embodiment includes an apparatus including a sealing tool and a cutting tool. The sealing tool comprises: a first roller configured to apply pressure to a first outer layer of a multi-layer insulating blanket; a second roller configured to apply pressure to a second outer layer of the multi-layer insulating blanket by pressing the first and second outer layers together between the first and second rollers; and a heating element configured to heat one or both of the first and second rollers to melt one or more inner layers, but not the first and second outer layers, of the multi-layer insulating blanket as the first and second rollers are moved in a lateral direction across an area of the first and second outer layers to thereby seal together the first and second outer layers of the area. The cutting tool includes a blade configured to cut the multi-layer insulating blanket in the sealed area by moving in the lateral direction behind the first and second rollers.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. An apparatus, comprising:
a sealing tool, comprising:
   a first roller configured to apply pressure to a first outer layer of a multi-layer insulating blanket;
   a second roller configured to apply pressure to a second outer layer of the multi-layer insulating blanket by pressing the first and second outer layers together between the first and second rollers; and
   a heating element configured to heat one or both of the first and second rollers to melt one or more inner layers, but not the first and second outer layers, of the multi-layer insulating blanket as the first and second rollers are moved in a lateral direction across an area of the first and second outer layers to thereby seal together the first and second outer layers of the area;
a cutting tool, including a blade configured to cut the multi-layer insulating blanket in the sealed area by moving in the lateral direction behind the first and second rollers; and
a robotic arm, onto which are mounted the sealing tool and the cutting tool.

2. The apparatus of claim 1, wherein the heating element is included in an axel of one or both of the first and second rollers.

3. The apparatus of claim 1, wherein the blade of the cutting tool is a static blade.

4. The apparatus of claim 1, wherein the blade of the cutting tool is a rotary blade.

5. The apparatus of claim 1, wherein the heating element is configured to melt the one or more inner layers when the one or more inner layers are made of polyethylene terephthalate.

6. The apparatus of claim 1, wherein the heating element in part of the robotic arm and the robotic arm is configured to transmit heat to an axel of one or both of the first and second rollers.

7. The apparatus of claim 1, wherein the apparatus is a spacecraft onto which the robotic arm is mounted.

8. The apparatus of claim 1, further comprising:
a control system configured to control the sealing tool and the cutting tool.

9. A spacecraft, comprising:
a robotic arm;
a sealing tool mounted onto the robotic arm and comprising:
   a first roller configured to apply pressure to a first outer layer of a multi-layer insulating blanket;
   a second roller configured to apply pressure to a second outer layer of the multi-layer insulating blanket by pressing the first and second outer layers together between the first and second rollers; and
   a heating element configured to heat one or both of the first and second rollers to melt one or more inner layers, but not the first and second outer layers, of the multi-layer insulating blanket as the first and second rollers are moved in a lateral direction across first area of the first and second outer layers to thereby seal together the first and second outer layers of the first area; and
a cutting tool mounted onto the robotic arm and comprising a blade configured to cut the multi-layer insulating blanket in the sealed first area by moving in the lateral direction behind the first and second rollers.

10. The spacecraft of claim 9, wherein the heating element is included in an axel of one or both of the first and second rollers.

11. The spacecraft of claim 9, wherein the blade of the cutting tool is a static blade.

12. The spacecraft of claim 9, wherein the blade of the cutting tool is a rotary blade.

13. The spacecraft of claim 9, further comprising:
a propulsion subsystem; and
a spacecraft controller connected to the propulsion subsystem, the robotic arm, the sealing tool, and the cutting tool, the spacecraft controller configured to approach the spacecraft to an on-orbit second spacecraft by use of the propulsion subsystem and, using the robotic arm:
   grapple the second spacecraft, the multi-layer insulating blanket being an insulating blanket of the second spacecraft.

14. The spacecraft of claim 13, the spacecraft controller further configured to:
seal the first area of the insulating blanket of the second spacecraft with the sealing tool;
cut the insulating blanket of the second spacecraft at the sealed first area with the cutting tool; and
access the second spacecraft through the cut in the sealed first area of the insulating blanket.

15. The spacecraft of claim 14, wherein, prior to sealing the first area of the insulating blanket of the second spacecraft, the spacecraft controller is further configured to:
seal a second area of the insulating blanket of the second spacecraft adjacent to the first area of the insulating blanket of the second spacecraft with the sealing tool;

15

16 cut the insulating blanket of the second spacecraft at the sealed second area with the cutting tool; and insert a portion of sealing tool through the cut in the insulating blanket of the second spacecraft at the sealed second area of the insulating blanket.

16. The spacecraft of claim 14, wherein, for an insulating blanket comprising a plurality of inner layers between a pair of outer layers, to seal the first area of the insulating blanket, the sealing tool is configured to:

apply heat and pressure to melt the inner layers, but not the outer layers, of the insulating blanket.

17. The spacecraft of claim 14, wherein the spacecraft controller is further configured to:

access the second spacecraft through the cut in the sealed first area to refill a fuel tank of the second spacecraft through an external port of the second spacecraft.

18. The spacecraft of claim 14, wherein the spacecraft controller is further configured to:

access the second spacecraft through the cut in the sealed first area to refill an oxidizer tank of the second spacecraft through an external port of the second spacecraft.

19. The spacecraft of claim 14, wherein the spacecraft controller is further configured to:

access the second spacecraft through the cut in the sealed first area to upload software to the second spacecraft through an external port of the second spacecraft.

* * * * *